US009602038B2

(12) United States Patent
Deflorio

(10) Patent No.: US 9,602,038 B2
(45) Date of Patent: Mar. 21, 2017

(54) METHOD AND DEVICE FOR CONTROLLING AN INVERTER

(71) Applicant: Robert Bosch GmbH, Stuttgart (DE)

(72) Inventor: Andrea Deflorio, Marbach am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 72 days.

(21) Appl. No.: 14/410,398

(22) PCT Filed: Apr. 22, 2013

(86) PCT No.: PCT/EP2013/058321
§ 371 (c)(1),
(2) Date: Dec. 22, 2014

(87) PCT Pub. No.: WO2013/189630
PCT Pub. Date: Dec. 27, 2013

(65) Prior Publication Data
US 2015/0340982 A1    Nov. 26, 2015

(30) Foreign Application Priority Data
Jun. 22, 2012 (DE) ........................ 10 2012 210 641

(51) Int. Cl.
| H02P 1/00 | (2006.01) |
| H02P 6/00 | (2016.01) |
| H02P 27/08 | (2006.01) |
| H02M 7/5387 | (2007.01) |
| H02P 29/00 | (2016.01) |
| H02M 7/42 | (2006.01) |
| H02M 1/32 | (2007.01) |

(52) U.S. Cl.
CPC .............. *H02P 27/08* (2013.01); *H02M 7/42* (2013.01); *H02M 7/53871* (2013.01); *H02P 29/0088* (2013.01); *H02M 2001/327* (2013.01)

(58) Field of Classification Search
CPC ............... H01L 2924/00; F25B 49/025; B60L 2240/545; B60L 2240/549; B60L 11/1872;
(Continued)

(56) References Cited

U.S. PATENT DOCUMENTS

| 6,114,828 A | 9/2000 | Matsunaga et al. |
| 6,268,986 B1 | 7/2001 | Kobayashi et al. |

(Continued)

FOREIGN PATENT DOCUMENTS

| CN | 102368668 A | 3/2012 | |
| DE | 102012210641 A1 * | 12/2013 | .......... H02P 29/0088 |
| WO | 2004036755 | 4/2004 | |

OTHER PUBLICATIONS

International Search Report for Application No. PCT/EP2013/058321 dated Aug. 6, 2013 (English Translation, 3 pages).

*Primary Examiner* — Marlon Fletcher
(74) *Attorney, Agent, or Firm* — Michael Best & Friedrich LLP

(57) ABSTRACT

The invention relates to a method (40) for controlling an inverter (10) using space-vector pulse width modulation, in particular to control an electric machine (14), said inverter (10) being equipped with a plurality of controllable switches (S) and a corresponding plurality of freewheeling diodes (D) and being designed to provide a polyphase electric current (IU, IV, IW) and a polyphase voltage in the form of current space vectors (I*, U*), in particular to supply polyphase electric current (IU, IV, IW) to the electric machine (14). In said method, the inverter (10) is controlled to establish a plurality of different successive switching states (V0-V7) for the switches (S), and the inverter (10) is switched to an off-load switching state (V0, V7) by means of two switching states (V0, V7), a switch-on time (t0-t7) of the switching states (V0-V7) being varied according to a desired load value (m) for the switches (S) and/or for the freewheeling diodes (D), the desired load value (m) being set according to a temperature (Ts, TD) of at least one of the switches (S) and/or one of the freewheeling diodes (D).

15 Claims, 3 Drawing Sheets

(58) Field of Classification Search
CPC .......... B60L 2210/42; B60L 2240/527; B60L 2240/529; H02P 27/08; H02P 27/06; H02P 29/0044
See application file for complete search history.

(56) References Cited

U.S. PATENT DOCUMENTS

| | | |
|---|---|---|
| 2005/0204761 A1 | 9/2005 | Karikomi et al. |
| 2008/0084716 A1* | 4/2008 | Ganev ............... H02M 1/14 363/39 |
| 2008/0258673 A1* | 10/2008 | Welchko ............ H02M 1/12 318/811 |
| 2008/0297100 A1* | 12/2008 | Hiti .................. B60L 15/025 318/801 |
| 2009/0058350 A1* | 3/2009 | Wei ................... H02P 29/0088 318/722 |
| 2009/0072770 A1 | 3/2009 | Son et al. |
| 2011/0149621 A1 | 6/2011 | Damson et al. |
| 2012/0086374 A1* | 4/2012 | Arisawa ............. H02M 7/5387 318/400.32 |
| 2015/0036400 A1* | 2/2015 | Webster ............. H02M 1/32 363/98 |
| 2015/0131351 A1* | 5/2015 | Hart ................... H02M 7/537 363/131 |
| 2015/0155795 A1* | 6/2015 | Hirsch ............... H02M 1/32 318/400.26 |
| 2015/0236628 A1* | 8/2015 | Wang ................. H02M 7/5395 318/139 |
| 2015/0357934 A1* | 12/2015 | Hirsch ............... H02P 29/0088 318/400.02 |
| 2016/0111973 A1* | 4/2016 | Deflorio ............. H02P 27/06 318/400.02 |

\* cited by examiner

METHOD AND DEVICE FOR CONTROLLING AN INVERTER

BACKGROUND OF THE INVENTION

The present invention relates to a method for controlling an inverter by means of space vector modulation, in particular for controlling an electrical machine, wherein the inverter has a plurality of controllable switches and a corresponding plurality of freewheeling diodes, and which is designed to provide a polyphase electric current and a polyphase electric voltage in the form of space vectors, in particular in order to supply the electrical machine with electric current in a polyphase fashion, wherein the inverter is controlled in order to set up a plurality of successive different switching states of the switches, wherein, by means of two switching states, the inverter is switched into a switching state which switches to zero potential.

The present invention also relates to a device for controlling an inverter which has a plurality of controllable power switches and a corresponding plurality of freewheeling diodes which are connected to provide a polyphase electric current and a polyphase electric voltage in the form of space vectors, in particular in order to supply the electrical machine with electric current in a polyphase fashion, having a control device which is designed to control the inverter such that the inverter assumes a plurality of successive different switching states of the switches, and wherein the inverter can assume two switching states which switch to zero potential.

The present invention also relates to a motor-vehicle drivetrain having at least one electrical machine for providing drive power, an inverter for controlling the electrical machine and having a device of the type described above for controlling the inverter.

Various control methods are known in the technical field of three-phase loads in general and of three-phase electrical machines in particular. In this case, the method of space vector modulation is currently usually preferable for controlling the three-phase load. In the case of this control method, a space vector is formed by consecutive setting of eight basic voltage phasors. In order to provide the string voltage, the basic voltage phasors are switched in a pulse-width-modulated manner, with the result that a corresponding control voltage is generated.

In the case of the known control methods, the electrical loads are controlled by means of an inverter with power semiconductor switches. The eight consecutive basic voltage phasors for generating the voltage space vector are set by virtue of particular power semiconductor switches of the inverter being alternately switched on and off. In the case of very low rotation speeds of the space vector or, provided the three-phase load is an electrical machine, in the case of low speeds of the controlled electrical machines, individual ones of the power semiconductor switches are switched very often or for a very long time and are thus thermally loaded with an electric current which flows for a very long time or very often. Therefore, the power semiconductor switches must be configured for very long switch-on times and for very large currents, which results in the inverter being generally elaborate in terms of technology.

In order to respond to an overload, in particular a thermal overload, of the power semiconductor switches, it is proposed in WO 2010/000548 A2, for example, to omit one of two switching states which switch to zero potential in particular pulse-width-modulation periods in order to reduce the switching losses of the power semiconductor switches.

Since the loading, in particular the thermal loading, of individual power semiconductor switches of the inverter is dependent on a phase angle of the provided current space vector or individual ones of the power semiconductor switches of the inverter are differently loaded for particular phase angles of the provided current space vector, it is proposed in DE 10393516 T1, for example, to use a particular zero vector in particular angular regions of the provided current space vector in order to reduce the switching losses of the power semiconductor switches.

It is disadvantageous here that, in certain control situations, particularly in the case of very low rotation speeds of the space vector, the losses occurring can heavily thermally load individual ones of the power semiconductor switches and/or individual ones of the freewheeling diodes, as a result of which overloading of the power semiconductor switches and/or the freewheeling diodes cannot be avoided.

SUMMARY OF THE INVENTION

Therefore, a method is provided according to the invention for controlling an inverter by means of space vector modulation of the type mentioned at the outset, wherein a switch-on time of the switching states is varied on the basis of a nominal loading value of the switches and/or the freewheeling diodes, and wherein the nominal loading value is set on the basis of a temperature of at least one of the switches and/or one of the freewheeling diodes.

Furthermore, according to the invention a device is therefore provided for controlling an inverter of the type mentioned at the outset, wherein the control device is designed to vary a switch-on time of at least one switching state on the basis of a nominal loading value of the switches and/or of the freewheeling diodes, and wherein the control device is designed to set the nominal loading value on the basis of a temperature of at least one of the switches and/or of one of the freewheeling diodes.

Finally, a motor-vehicle drivetrain is provided according to the invention having at least one electrical machine for providing drive power, an inverter for controlling the electrical machine and having a device of the type described above for controlling the inverter.

By virtue of the fact that the nominal loading value, in particular the nominal thermal loading value, is set on the basis of a temperature of a switch or of a freewheeling diode of the inverter and the power loss is accordingly varied across the switch-on time of the switching states on the basis of the nominal loading value, the temperature of the switches and/or of the freewheeling diodes can be set evenly. In other words, the switches and/or the freewheeling diodes are loaded according to the nominal loading value.

As a result, an optimum temperature distribution of the switches and/or of the freewheeling diodes can be set in a targeted manner, even for critical phase angles of the required voltage space vector and current space vector. Thus, thermal peak values can be avoided and the controllable switches and/or the freewheeling diodes can be generally configured for lower thermal loadings, as a result of which the inverter can be manufactured to be generally technically less complex and more cost-effective. Furthermore, by virtue of the more even loading of the switches and/or of the freewheeling diodes, the service life of the inverter can be generally lengthened.

Preferably, the nominal loading value is varied on the basis of a temperature difference between two of the switches or two of the freewheeling diodes or one of the switches and one of the freewheeling diodes.

As a result, a more even thermal loading can be achieved since a measured temperature difference is directly used as control variable.

In this case, it is particularly preferable if a first one of the two switches or a first one of the two freewheeling diodes is assigned to a high supply voltage potential and a second one of the two switches or a second one of the two freewheeling diodes is assigned to a low supply voltage potential.

As a result, the temperature difference between a component of the upper side of the inverter and a component of the lower side of the inverter can be compared, with the result that temperature differences between the upper and the lower side of the inverter can be compensated.

It is further preferred if the first one of the switches or the first one of the freewheeling diodes is the most heavily loaded component which is assigned to the high supply voltage potential and the second one of the switches or the second one of the freewheeling diodes is the most heavily loaded component which is assigned to the low supply voltage potential.

As a result, thermal loading spikes of the inverter can be avoided.

It is further generally preferred if a switch-on time of a first one of the switching states which switch to zero potential is varied on the basis of the nominal loading value.

As a result, uneven thermal loadings of the inverter can be prevented or compensated using simple measures.

It is further preferred if the switch-on time of the switching states is varied per pulse-width-modulation period.

As a result, uneven thermal loading can be quickly and precisely counteracted.

It is further preferred if the switch-on time per pulse-width-modulation period of a first switching state which switches to zero potential to a total time of the switching states which switch to zero potential per pulse-width-modulation period is varied on the basis of the nominal loading value.

As a result, it is possible to set the nominal loading value precisely to a desired value using simple measures.

It is further preferred if the nominal loading value is determined iteratively in steps on the basis of the temperature of the at least one switch and/or of the at least one freewheeling diode.

As a result, a continuous adaptation of the thermal loading of the inverter can be provided.

It is further preferred if the temperature of the at least one switch and/or of the at least one freewheeling diode is measured.

As a result, the thermal loading of the inverter can be precisely determined.

It is alternatively preferred if the temperature of the at least one switch and/or of the at least one freewheeling diode is estimated.

As a result, the temperature, and thus thermal loadings, of the inverter can be determined with low expenditure in terms of technology.

As a result, by virtue of the present invention, the inverter can be loaded more evenly, even in the case of low rotational frequencies of the voltage space vector and/or of the current space vector, by the power loss being correspondingly varied over the switch-on time of the switching states without the provided voltage space vector and/or current space vector being influenced. As a result, the thermal loading of the inverter can be more evenly distributed on the switches and/or the freewheeling diodes, as a result of which the inverter can be configured for lower loading and as a result of which the service life of the inverter can be increased.

It goes without saying that features, properties and advantages of the method according to the invention also correspondingly apply or are applicable to the device according to the invention.

DETAILED DESCRIPTION

Figure 1:
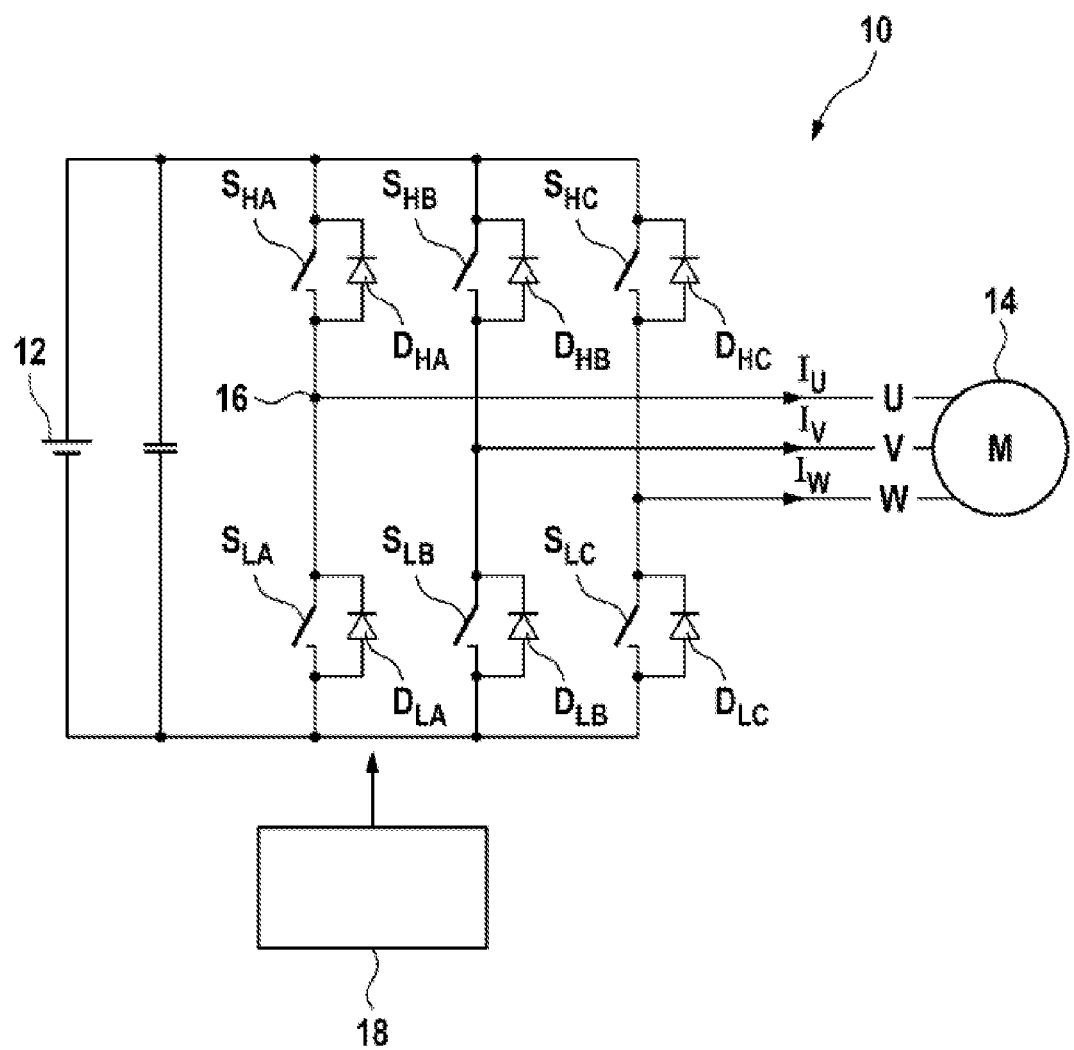
FIG. 1 schematically shows an inverter for controlling a three-phase load.

FIG. 1 schematically illustrates an inverter for controlling an electrical load, in particular an electrical machine, which inverter is generally denoted by 10.

The inverter 10 is connected to a DC voltage source 12 and is used to energize the electrical load 14, which in this case is designed as an electrical machine 14, in a three-phase fashion. The inverter has three half-bridges which are connected in parallel with the DC voltage source 12 and have in each case two controllable switches S. Between the switches S, a half-bridge tap 16 is formed in each case, which half-bridge taps are each connected to a phase conductor of the phases U, V, W of the electrical machine 14.

In each case, a freewheeling diode D which enables a flow of current in the opposite direction is connected in parallel with the switches S.

In FIG. 1, the switches S are denoted by SHA, SLA, SHB, SLB, SHC, SLC corresponding to the phase U, V, W which they provide and corresponding to the assignment to a high potential of the DC voltage source 12 or to a low potential of the DC voltage source 12. Correspondingly, the freewheeling diodes are denoted by DHA, DLA, DHB, DLB, DHC, DLC.

By alternating opening and closing of the switches S, in each case a control voltage is applied between the phase conductors U, V, W, with the result that in each case a phase current IU, IV, IW which drives the electrical machine 14 is correspondingly set. The inverter 10 is preferably designed using semiconductor switches. The switches of the inverter are alternately opened and closed by means of a schematically illustrated control unit 18 in order to provide the phase voltages with a particular profile and to provide a rotating voltage space vector and to correspondingly energize the electrical machine 14 with the phase currents IU, IV, IW.

Figure 2:
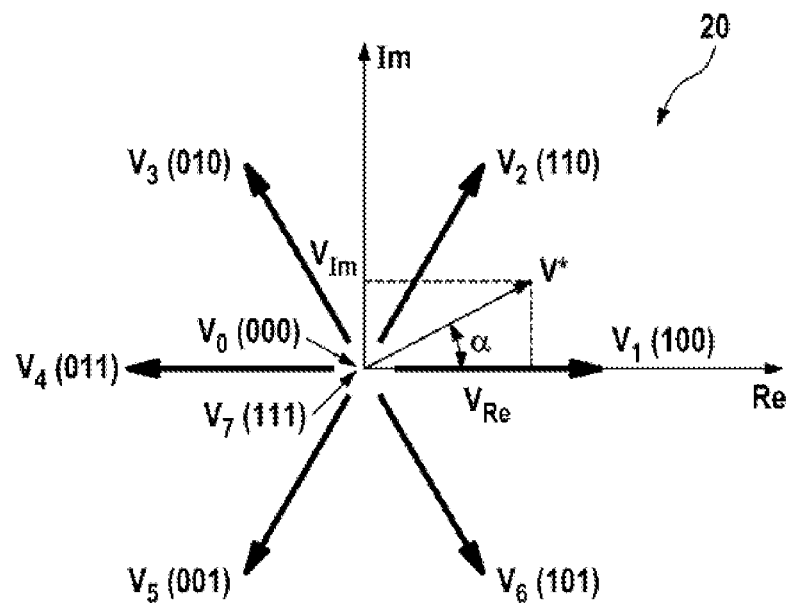
FIG. 2 shows a complex phasor diagram to explain the space vector modulation method for controlling the inverter of an electrical load.

FIG. 2 illustrates a complex phasor diagram to explain the space vector modulation for controlling the load 14 or the electrical machine 14, which complex phasor diagram is generally denoted by 20.

The phasor diagram 20 illustrates a voltage phasor V* with a control angle alpha of the electrical machine 14. The phasor diagram 20 also illustrates six basic voltage phasors V1, V2, V3, V4, V5, V6 which arise when one or two of the switches S of the inverter 10 are closed and the electrical machine is correspondingly controlled. In order to set the voltage phasor V* with maximum length, which has the control angle alpha between the basic voltage phasors V1 and V2 in this example, said voltage phasor V* is realized by alternate control of the inverter 10 corresponding to the basic voltage phasor V1 and the basic voltage phasor V2. The two basic voltage phasors V1, V2 are alternately set with a predefined switching frequency, with the result that the voltage phasor V* with a phase angle of 30° arises in the case of even switch-on times of the basic voltage phasors V1, V2. If a voltage phasor V* with a larger control angle alpha must be set, the switch-on time of the basic voltage phasor V2 is correspondingly increased and the switch-on time of the basic voltage phasor V1 is reduced. Thus, by clocked control of the switches S of the inverter 10, the voltage space vector V* can be realized with any control angle alpha. In this case, the voltage space vector is provided by the inverter 10, whereupon the current space vector is set on the basis of the controlled load 14.

If the voltage phasor V*, as in the case illustrated in FIG. 2, is to be set with a lower magnitude (smaller length) than the basic voltage space vectors V1, V2, a zero voltage phasor V0, V7 is correspondingly set, in the case of which the switches SHA, SHB, SHC on the upper side or SLA, SLB, SLC on the lower side of the inverter 10 are opened. The respective other ones of the switches S are correspondingly closed. Correspondingly, the voltage phasor V* can be realized by a combination of the basic voltage space vectors V1 and V2 and one of the zero voltage phasors V0, V7.

A current space vector I* is set on the basis of the voltage space vector V*. The current space vector I* has an amplitude and a phase angle which are set on the basis of the controlled electrical load 14. The phase angle of the current space vector I* can be in phase with the phase angle α of the voltage space vector V* or can have a phase shift.

In order to energize the load 14 or the electrical machine 14, the voltage space vector V* is provided by the different basic voltage space vectors V1-V6 and the zero voltage vectors V0, V7 being set consecutively in quick succession. As a result, the different switches S and the different freewheeling diodes D of the inverter 10 are evenly loaded, in particular evenly loaded in phase, in the case of a voltage space vector V* which rotates in a rapid manner. If the rotation frequency of the voltage space vector V* is very low or zero, for example in the case of low speeds of the electrical machine 14, the corresponding switches S and the freewheeling diodes D of the inverter 10 of a phase U, V, W are loaded over a long period of time, with the result that the corresponding switches S and the freewheeling diodes D can be overloaded and the switches S and the freewheeling diodes D of the inverter 10 are generally loaded unevenly, in particular out of phase. In order to prevent an overloading of individual ones of the switches S and the freewheeling diodes D, measures must be taken to distribute the loading to different ones of the switches S and the freewheeling diodes D. The electric power loss and thus the temperature of the switches S or the freewheeling diodes D is a function of the magnitude V of the voltage space vector V*, the phase angle alpha_V, the magnitude I of the current space vector I* and the phase angle alpha_I.

Figure 3:
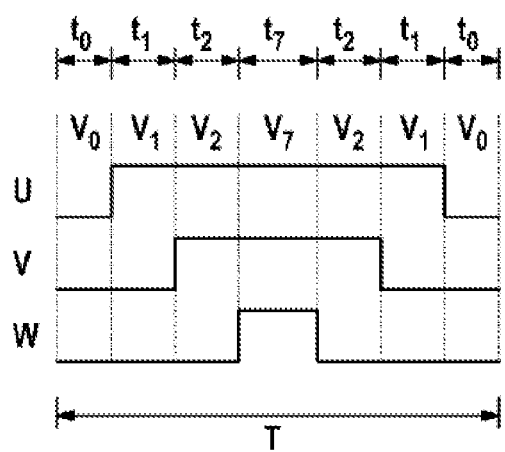
FIG. 3 schematically shows a profile of three string voltages for setting different voltage space vectors.

FIG. 3 illustrates profiles of the phase voltages of the three phases U, V, W within a pulse-width-modulation period T, in order to set the basic voltage space vectors V0, V1, V2, V7 consecutively. Within the pulse-width-modulation period T, a switch-on time t0, t1, t2, t7 of the individual basic voltage space vectors V0, V1, V2, V7 can be varied in order to be able to precisely set the voltage space vector V*.

Since the zero voltage phasor V0 merely loads the switches SLA, SLB, SLC which are assigned to the low potential of the voltage source 12, and since, correspondingly, the zero voltage phasor V7 merely loads the switches SHA, SHB, SHC which are assigned to the high potential of the DC voltage source 12, an uneven loading between the upper switches SHA, SHB, SHC or the freewheeling diodes DHA, DHB, DHC and the lower switches SLA, SLB, SLC or freewheeling diodes DLA, DLB, DLC can be compensated by a targeted distribution of the zero voltage phasors V0, V7. A corresponding loading value m can be calculated using the formula $$m = \frac{t_7}{t_0 + t_7},$$

wherein m is the loading value, t0 is the switching time of the zero voltage phasor V0 and t7 is the switching time of the zero voltage phasor V7. The loading value m can consequently be set between the value 1 and the value 0, wherein, in the event of a value 1, the upper switches SHA, SHB, SHC or the upper freewheeling diodes DHA, DHB, DHC of the inverter 10 are more heavily loaded and, in the event of a value 0, the lower switches SLA, SLB, SLC or the lower freewheeling diodes DLA, DLB, DLC of the inverter 10 are more heavily loaded. This applies in particular to the calculation of the loading value m as long as two basic voltage space vectors V1-V6 and at least one zero voltage phasor V0, V7 are used, such as for a control sequence according to FIG. 3, for example.

Usually, a general loading value lsm can also be determined on the basis of the general switch-on time t of one of the switches S. In this case, one of the switches S is selected, such as that one which is most heavily loaded, for example. The loading value lsm is in this case calculated, for one of the switches SHA, SHB, SHC of the upper side of the inverter 10, by:

$$lsm = \frac{t_{on} - t_{min}}{t_{max} - t_{min}},$$

and, for one of the switches SLA, SLB, SLC of the lower side of the inverter 10, by:

$$lsm = 1 - \frac{t_{on} - t_{min}}{t_{max} - t_{min}}$$

wherein t_min is the minimum possible switch-on time of the switch S, t_max is the maximum possible switch-on time of the switch S in order to set the present voltage space vector V* and t_on is the present switch-on time in the corresponding pulse-width-modulation period T which sets the present voltage space vector V*. As a result, a greater degree of freedom occurs in order to be able to set lsm. In this case, it should be noted that the general loading value lsm remains the same independently of which of the switches has been used for the calculation. As a result, the loading of a switch S of the inverter 10 can be taken into account in order to set a new nominal loading value. In this case, the loading value m can be replaced by the general loading value lsm.

Figure 4:
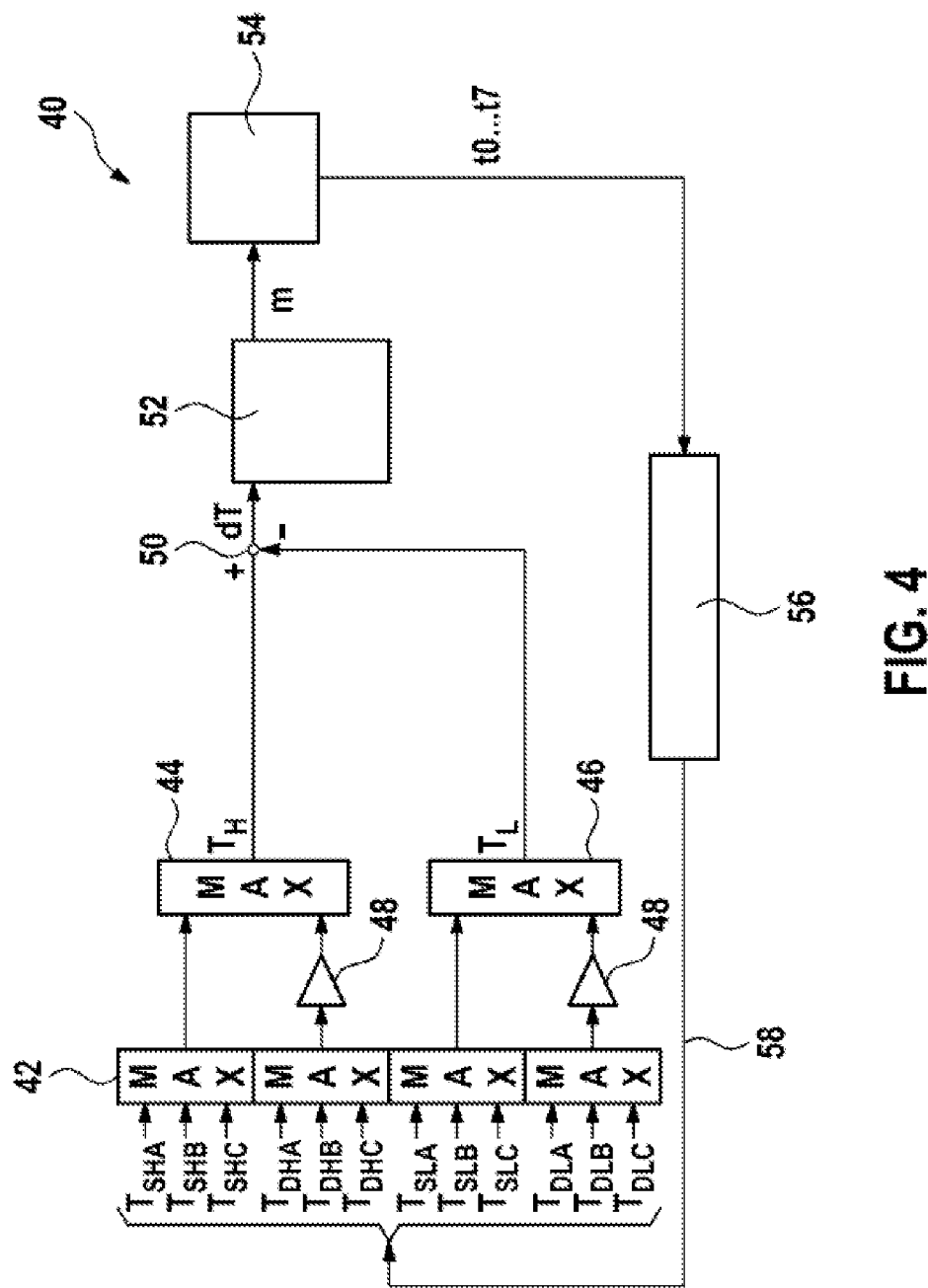
FIG. 4 schematically shows a detailed sequence for determining a nominal loading value on the basis of temperatures of the switches and/or freewheeling diodes of the inverter.

FIG. 4 illustrates a method in order to determine the loading value m on the basis of an estimated or measured temperature $T_D$, $T_S$ of the switches S and/or of the freewheeling diodes D and to set a new nominal loading value m. In FIG. 4, the method is generally denoted by 40.

The temperatures $T_D$, $T_S$ of the switches S and of the freewheeling diodes D are generally used as input variable of the method 40. At 42, the most heavily loaded upper switch SH, the most heavily loaded upper diode DH, the most heavily loaded lower switch SL and the most heavily loaded lower diode DL are calculated by means of the temperatures $T_D$, $T_S$. In other words, the respective component which has the highest temperature is calculated. From said temperatures, at 44 and 46, the maximum temperature T_H of the upper switches SH or the upper freewheeling diodes T_H is calculated and the maximum temperature T_L of the lower switches SL or freewheeling diodes DL is calculated. Since the freewheeling diodes D and the switches S have different loading limits or are configured for different maximum loading temperatures, corresponding comparison values for the temperatures $T_D$ of the freewheeling diodes D must be determined so that they can be compared with the temperatures $T_S$ of the switches S, more precisely using the formula:

$$T_{DV} = c \cdot T_D$$

wherein $T_{DV}$ is the comparison value of the temperature of the freewheeling diode D, $T_D$ is the temperature of the freewheeling diode D and the factor c is a constant. In a particular embodiment, the factor c can also be a function of the temperature $T_D$ of the freewheeling diode. Correspondingly, the temperature $T_D$ of the freewheeling diodes D is factorized using the formula mentioned above in order to be able to compare the temperatures $T_S$ of the switches S with the temperatures $T_D$ of the freewheeling diodes D, as shown at 48. At a summing point 50, the difference dT between the maximum temperature T_H of the upper side and the maximum temperature T_L of the lower side is calculated. At 52, an amended nominal loading value m is determined on the basis of the temperature difference dT in order to correspondingly compensate the temperature difference dT. If the temperature difference dT>0, the nominal loading value m is reduced and if the temperature difference dT<0, the nominal loading value m is increased. On the basis of the nominal loading value m determined in this way, new switch-on times t0-t7 are determined at 54 for the following pulse-width-modulation period T. On the basis of the new pulse-width-modulation period T, amended temperatures $T_D$, $T_S$ of the switches S and of the freewheeling diodes D are calculated, as is shown at 56, and are provided as new input variables for the method 40, as is indicated by the feedback loop 58. As a result of this, on the basis of the measured or estimated temperature of the switches S and/or of the freewheeling diodes D, a new nominal loading value m can be determined for each pulse-width-modulation period T in order to evenly load the corresponding switches S and freewheeling diodes D. Owing to the comparison of the temperature of the components of the upper side and of the lower side, and owing to the adaptation of the loading value m, the components of the upper side can thus be more evenly loaded relative to the components of the lower side.

At 52 and 54, a predefined control sequence can also be selected on the basis of the temperature difference dT, wherein, when dT>0, a sequence with a low loading value m is selected and, when dT<0, a sequence with a higher loading value m is selected. In this case, V*, which these sequences set, is identical. As a result, the switching losses in the inverter 10 can be reduced. The predefined sequences are preferably stored in a characteristic map.

In an alternative embodiment of the method 40, instead of the temperatures of the components S, D, power losses are used to determine the nominal loading value m, which power losses are calculated or determined by integration of the power loss of the respective component S, D or by integration of the electric current I in the respective component S, D and/or by integration of the square of the electric current $I^2$ in the respective component S, D over a predefined period of time.

In another embodiment of the method 40, instead of the temperatures of the components S, D, the electrical losses P or the electric current I in the respective component S, D and/or the square of the electric current $I^2$ in the respective component S, D are used to determine the nominal loading value m, which electrical losses or electric currents are in each case filtered by means of a low-pass filter.

The invention claimed is:

1. A method (40) for controlling an inverter (10) by space vector modulation, wherein the inverter (10) has a plurality of controllable switches (S) and a corresponding plurality of freewheeling diodes (D), and which is designed to provide a polyphase electric current (IU, IV, IW) and a polyphase voltage in the form of space vectors (I*, U*), wherein the inverter (10) is controlled in order to set up a plurality of successive different switching states (V0-V7) of the switches (S), wherein, by means of two switching states (V0, V7), the inverter (10) is switched into a switching state (V0, V7) which switches to zero potential,
    characterized in that
    a switch-on time (t0-t7) of the switching states (V0-V7) is varied on the basis of a nominal loading value (m) of the switches (S) and/or of the freewheeling diodes (D), and wherein the nominal loading value (m) is set on the basis of a temperature ($T_S$, $T_D$) of at least one of the switches (S) and/or one of the freewheeling diodes (D); and
    wherein the nominal loading value (m) is varied on the basis of a temperature difference (dT) between one of the switches (S) in an upper side of the inverter and one of the switches (S) in a lower side of the inverter or one of the freewheeling diodes (D) in the upper side of the inverter and one of the freewheeling diodes (D) in the lower side of the inverter or one of the switches (S) in the upper side of the inverter and one of the freewheeling diodes (D) in the lower side of the inverter or one of the switches (S) in the lower side of the inverter and one of the freewheeling diodes (D) in the upper side of the inverter.

2. The method as claimed in claim 1, wherein a first one of the two switches (S) or a first one of the two freewheeling diodes (D) is assigned to a high supply voltage potential and a second one of the two switches (S) or a second one of the two freewheeling diodes (D) is assigned to a low supply voltage potential.

3. The method as claimed in claim 2, wherein the first one of the switches (S) or the first one of the freewheeling diodes (D) is the most heavily loaded component which is assigned to the high supply voltage potential and the second one of the switches (S) or the second one of the freewheeling diodes (D) is the most heavily loaded component which is assigned to the low supply voltage potential.

4. The method as claimed in claim 1, wherein a switch-on time (t0, t7) of a first one of the switching states (V0, V7) which switch to zero potential is varied on the basis of the nominal loading value (m).

5. The method as claimed in claim 1, wherein the switch-on time (t0-t7) of the switching states (V0-V7) is varied within a pulse-width-modulation period (T).

6. The method as claimed in claim 5, wherein the switch-on time (t0, t7) per pulse-width-modulation period (T) of a first switching state (V0, V7) which switches to zero potential to a total time of the switching states (V0, V7) which switch to zero potential per pulse-width-modulation period (T) is varied on the basis of the nominal loading value (m).

7. The method as claimed in claim 1, wherein the nominal loading value (m) is determined iteratively in steps on the basis of the temperature ($T_S$, $T_D$) of the at least one switch (S) and/or of the at least one freewheeling diode (D).

8. The method as claimed in claim 1, wherein the temperature ($T_S$, $T_D$) of the at least one switch (S) and/or of the at least one freewheeling diode (D) is measured.

9. The method as claimed in claim 1, wherein the temperature ($T_S$, $T_D$) of the at least one switch (S) and/or of the at least one freewheeling diode (D) is estimated.

10. The method as claimed in claim 2, wherein the nominal loading value (m) for setting the voltage space vector (V*) or the current space vector (I*) is determined on the basis of maximum and minimum possible losses ($P_{Hmax}$, $P_{Hmin}$) of a switch (S) and/or of a freewheeling diode (D) which are assigned to the high supply voltage potential, and on the basis of maximum and minimum possible losses ($P_{Lmax}$, $P_{Lmin}$) of a switch (S) and/or of a freewheeling diode (D) which are assigned to the low supply voltage potential.

11. The method as claimed in claim 1, wherein the inverter (10) drives an electrical machine (14).

12. A device (18) for controlling an inverter (10) which has a plurality of controllable power switches (S) and a corresponding plurality of freewheeling diodes (D) which are connected to provide a polyphase electric current (IU, IV, IW) and a polyphase voltage in the form of space vectors (I*, V*), having a control device (18) which is designed to control the inverter (10) such that the inverter (10) assumes a plurality of successive different switching states of the switches (S), and wherein the inverter (10) can assume two switching states (V0, V7) which switch to zero potential, characterized in that the control device (18) is designed to vary a switch-on time (t0-t7) of at least one switching state (V0-V7) on the basis of a nominal loading value (m) of the switches (S) and/or of the freewheeling diodes (D), and wherein the control device (18) is designed to set the nominal loading value (m) on the basis of a temperature ($T_S$, $T_D$) of at least one of the switches (S) and/or of one of the freewheeling diodes (D); wherein the nominal loading value (m) is varied on the basis of a temperature difference (dT) between one of the switches (S) in an upper side of the inverter and one of the switches (S) in a lower side of the inverter or one of the freewheeling diodes (D) in the upper side of the inverter and one of the freewheeling diodes (D) in the lower side of the inverter or one of the switches (S) in the upper side of the inverter and one of the freewheeling diodes (D) in the lower side of the inverter or one of the switches (S) in the lower side of the inverter and one of the freewheeling diodes (D) in the upper side of the inverter.

13. A motor-vehicle drivetrain having at least one electrical machine (14) for providing drive power, an inverter (10) for controlling the electrical machine (14) and having a device (18) as claimed in claim 12 for controlling the inverter (10).

14. The method as claimed in claim 11, wherein the inverter (10) supplies the electrical machine (14) with the electric current (IU, IV, IVV) in a polyphase manner.

15. The device (18) as claimed in claim 12, wherein the inverter (10) energizes the electrical machine (14) with the electric current (IU, IV, IW) in a polyphase manner.

* * * * *